Nov. 8, 1955  H. B. MILLER  2,723,081
OVERRUN CONTROL FOR ROTARY-COUNTER REGISTERS
Filed March 20, 1951
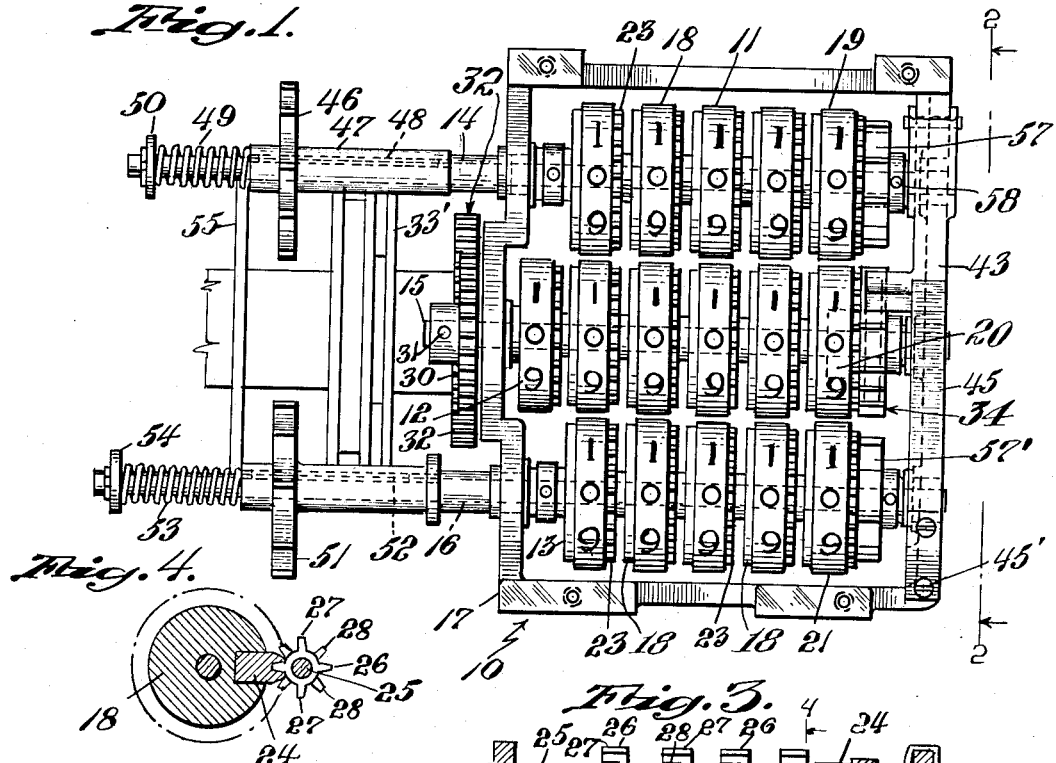
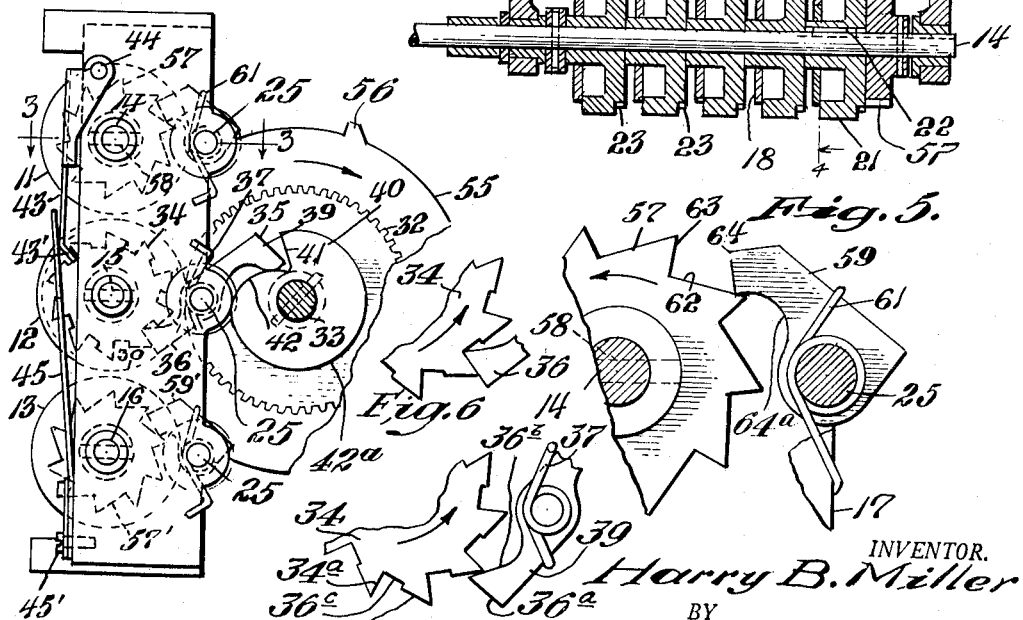
INVENTOR.
Harry B. Miller
BY
Roberts, Cushman & Graves
ATTORNEYS.

United States Patent Office 2,723,081
Patented Nov. 8, 1955

2,723,081

OVERRUN CONTROL FOR ROTARY-COUNTER REGISTERS

Harry B. Miller, Warwick, R. I., assignor to Max L. Grant, Providence, R. I.

Application March 20, 1951, Serial No. 216,649

6 Claims. (Cl. 235—131)

This invention relates to improvements in registers, more particularly to rotary-counter type registers. In a rotary-counter register number-bearing disks are arranged side by side in coaxial series and connected with one another by gearing so devised that, for each complete revolution of a disk of lower order, the disk of next higher order will be turned one division. If, in such a register, one of the counter disks overruns while it is being turned, the registered total will be too high. On the other hand, if, by accident or purposely, a counter disk be turned in the reverse direction, as is sometimes attempted in fare collecting registers to conceal pilfering of registered coins, the total will be too low. A principal object of the present invention is to provide a register of the rotary-counter type so devised as to prevent overrun when a counter disk is turned in the proper direction, and also to prevent reverse rotation of the counter disk either accidentally or purposely. A more specific object of the invention is to provide a register of the above type having provision for positively locking the counter at the completion of its forward advance. A further object is to provide a lock for a rotary counter which automatically moves into position to prevent substantial overrun of the counter at the end of its advance movement. Another object of the invention is to provide an overrun-correcting device for a rotary counter which will restore the counter to proper position if slight overrun is initiated. A further object is to provide a register of the above type having provision whereby reverse rotation of the counter disk is positively prevented. Other and further objects and advantages of the invention will be pointed out in the following more detailed description and by reference to the accompanying drawings wherein Fig. 1 is a side elevational view of a rotary type counter embodying my invention;

Fig. 2 is a fragmentary edge elevational view thereof looking in the direction of the arrows on the line 2—2 of Fig. 1;

Fig. 3 is a sectional view taken substantially along the line 3—3 of Fig. 2;

Fig. 4 is a sectional view taken substantially along the line 4—4 of Fig. 3;

Fig. 5 is a fragmentary, vertical section, on an enlarged scale, showing one of the locking arrangements for preventing an overrun of the counter;

Fig. 6 is a fragmentary elevation illustrating a ratchet wheel forming an element of the device of the present invention, showing a pawl fully engaged therewith to prevent reverse rotation; and Fig. 7 is a view similar to Fig. 6 but showing the pawl in position to correct over-travel of the ratchet.

Referring to the drawings, the numeral 10 designates, generally, a rotary-type counter for a multiple fare collection machine, the counter being so designed as to permit the use of unusually large numerals so that the register may be read from a substantial distance. The device here illustrated comprises three rows of rotary numeral disks 11, 12, and 13, respectively. The axes of these three rows of disks are in the same vertical plane and spaced apart one above the other. The several rows of disks are substantially alike with the exception that the upper and lower rows are five-digit counters while the middle row is a six-digit counter. Each row of number disks is mounted on a shaft 14, 15, and 16, respectively. The shafts are journaled in the supporting frame 17. The disks on each shaft are alike and are mounted in coaxial relation and slightly spaced apart, there being one disk for each digit of a row. The right-hand disks 19, 20 and 21 of each row, respectively, and which are the disks of lowest order, are fixed to their respective shafts, as indicated at 22 (Fig. 3), the other disks of each row being free on their respective shafts. Each disk has a wide, cylindrical, peripheral surface on which are arranged numerals from 0 to 9. A surface width of 9/32 inch and a diameter of 1¼ inches, for example, provides ample space for numerals which are readily legible for the length of the usual bus. A gear 23 (Fig. 3) having twenty teeth is secured to the right-hand face of each number disk. A gear segment 24 (Fig. 4) having two teeth is secured to the left-hand face of each of the disks, except the left-hand disk of each row which is without such segment gear. The disks are arranged on their respective shafts so that the segment gear 24 of one disk is closely adjacent to the gear 23 of the next adjacent disk to the left.

A stationary shaft 25 (Fig. 3) is associated with each row of number disks 11, 12 and 13, respectively, each shaft 25 being fixed at its opposite ends in the supporting frame and being parallel to and having its axis in the horizontal plane of the axis of the shaft which carries the corresponding row of disks. Each shaft 25 carries a plurality of freely rotatable pinion gears 26, the several gears 26 being alike and each being mounted to rotate in a plane passing between two of the adjacent number disks. Each pinion 26 has four teeth 27 (Figs. 3 and 4) which are sufficiently wide, in the axial direction of the pinion, to be engaged simultaneously by the teeth of the segment gear 24 of one of the disks and with the teeth of the gear 23 of the next adjacent disk. Each pinion 26 also has a plurality of shorter teeth 28, intervening between the teeth 27, which are of a width, axially of the pinion, such that they engage only with the teeth of the gear 23.

At the completion of each rotation of a disk of lower order, its gear segment 24 will engage teeth 27 of the pinion 26 associated therewith, and will turn the pinion sufficiently so that the pinion teeth 28, having engagement with the gear 23 of the adjacent disk, will turn the latter disk one division. Thus, for each complete rotation of a disk of lower order, the adjacent disk of higher order will be turned an angular amount equal to one division.

The counters 11 and 13 are employed in the present instance for registration of quarters and tokens, respectively, while the counter 12 is employed for registering pennies, nickels and dimes. The counter 12 is rotated by means of a gear 30 (Fig. 1) which is secured to the shaft 15 by means of a pin 31 so as to rotate therewith. The gear 30 engages with a drive gear 32 (Fig. 2) rotatably mounted on a shaft 33 which makes one complete rotation of each cycle of operation of the machine. A clutch, designated generally 33' (Fig. 1), the mechanism of which forms no part of this invention and is not shown, is operable to engage the gear 32 with the shaft 33 at predetermined points in the rotation of said shaft so that for each one-cent piece registered the disk 20 will be rotated one division; for each nickel registered the said disk 20 will be rotated five divisions; and for a dime ten divisions.

In order to prevent overrun of the disks of the row 12, a ratchet wheel 34 (Figs. 1, 2, 6 and 7) is secured to the shaft 15 adjacent to the disk 20 so as to rotate therewith. As overrun correcting pawl 35 (Fig. 2) is pivotally mounted on the shaft 25 which carries the pinions 26, and has a detent arm 36 arranged to engage teeth of the ratchet wheel 34, the detent arm being urged toward the wheel 34 by means of a torsion spring 37. The pawl 35 has a second arm 39 which is arranged for engagement by a cam 40 (Fig. 2) mounted on the shaft 33 so as to rotate therewith, thus making one complete rotation for each cycle of operation of the registering mechanism. This cam 40 has a substantially radial drop portion or shoulder 41 and a riser portion 42. As the cam rotates, the riser portion 42 of the cam engages the arm 39 and thereby disengages the detent 36 from the wheel 34. A dwell portion 42ª of the cam continues to hold the detent out of engagement with the ratchet wheel 34 while the gear 32 is rotated to turn the shaft 15. The cam 40 is so positioned on the shaft that, at the beginning of a cycle of operations, the riser portion 42 will engage the arm 39 and move the detent 36 out of engagement with the wheel 34, thereby freeing the shaft 15 for rotation. At the completion of one revolution of the shaft 33 the cam will have turned so that the pawl arm 39 will drop down quickly, at the drop portion 41 of the cam, whereupon the spring 37 will swing the detent arm 36 toward the ratchet wheel 34. When the end face 36ª of the detent engages the radial face 34ª of the ratchet tooth, the face 36ª of the detent is substantially radial with respect to the ratchet wheel and positively locks the ratchet wheel against further advance. The wheel 34 is locked against movement in the reverse direction (while the pawl 35 is temporarily held out of engagement therewith by the cam 40) by means of a swinging latch arm 43 (Fig. 2) pivotally mounted at 44 on the supporting frame 17 and having a finger 43′ arranged to engage the teeth of the wheel 34. One end of a leaf spring 45 is fixed to the frame 17 at 45′, and its free upper end engages the arm 43 so as normally to hold the finger 43′ in engagement with the wheel 34.

Referring to Figs. 6 and 7, it may be noted that while the front or leading face 34ª of the ratchet tooth is substantially radial the rear or trailing edge 34ᵇ of the tooth is steeply inclined and substantially perpendicular to the radial front face 34ª. The detent portion 36 of the pawl 39 has a face 36ª at its free end, as above described, which when the pawl is fully engaged with the ratchet tooth (Fig. 6) is parallel to and in contact with the radial face 34ª of the ratchet thereby positively preventing advance of the ratchet. The detent portion 36 of the pawl also has an inclined cam face 36ᵇ. If the ratchet wheel should stop at the completion of a cycle of operation of the machine, before a numeral on the disk head has fully reached the proper position for observation, this cam face 36ᵇ of the pawl by contact with the end of the ratchet tooth, as shown in Fig. 7, will exert a pressure against the ratchet tooth so as to cause a fractional rotation of the ratchet wheel sufficient to engage the end face 36ª of the pawl with the radial face 34ª of the next tooth, thus bringing the ratchet to rest in accurate position so that the numeral on the disk will be properly registered with the aperture through which it should be viewed.

The row of counter disks 11, as previously noted, is employed for registering quarters. A toothed wheel 46, having an elongated hub 47 slidable on the shaft 14, is connected to rotate with the shaft by means of the key 48. A compression spring 49, positioned between the hub of the wheel 46 and an abutment 50 fixed to the shaft 14, urges the wheel 46 axially of the shaft toward the right, as viewed in Fig. 1.

The shaft 16, which carries the token-counting disks 13, is provided with a similar toothed wheel 51 which has an elongate hub arranged to slide axially along the shaft but which is connected to rotate with the shaft by a key 52. A compression spring 53, positioned between the hub of the wheel 51 and an abutment 54 at the end of the shaft, tends to move the wheel 51 axially to the right, as viewed in Fig. 1. A disk 55 (Fig. 2), having a single peripheral tooth 56, is fixed to the shaft 33 so as to rotate with the latter. Gauging means (not shown), including a part which is contacted with the edge of a coin or the like and is thereby variably positioned in accordance with the diameter of the particular coin which it contacts, includes devices, for example cam elements, operative by engagement with one or the other of the wheels 46 or 51 (according to the coin being gauged) to move the selected wheel 46 or 51 axially into the plane of rotation of the disk 55. Each of the wheels 46 and 51 has ten teeth, and when the tooth 56 of the rotary disk 55 engages a tooth of one of the wheels 46 or 51, said wheel is turned one tooth space, thereby turning the corresponding shaft 14 or 16 one-tenth of a revolution, thus turning the disk 19 or 21, respectively, through one unit space for each revolution of the shaft 33.

In order to prevent overrun of the counters of the row 11, a ratchet wheel 57 (Fig. 5) is secured to the shaft 14 adjacent to the disk 19 by means of a pin 58. A combined pawl and detent 59 (Fig. 5), pivoted on the shaft 25 which carries the upper row of pinions 26, is resiliently urged by a torsion spring 61 into engagement with the ratchet wheel 57, exerting sufficient force on the ratchet wheel to prevent free rotation of the wheel. However, should there be a slight accidental overrun of the shaft, as illustrated in Fig. 5, the pressure of the pawl 59 on the surface 62 of the tooth of the ratchet wheel, by a camming action, will turn the wheel in a reverse direction until the face 63 of the next adjacent tooth engages the edge 64 of the pawl, thereby positively locking the wheel 57 against further movement in the reverse direction. The shaft 16, which carries the token-counting disks 13, is similarly provided with a ratchet wheel 57′ which is engaged by a pawl 59′ (Fig. 2) pivotally mounted on the shaft 25 which carries the lower row of pinions 26. Since all of the disks of a row are geared together, the control of overrun or reversal of the disk of lowest order of each row prevents overrun or reversal of the other disks of the row.

While a desirable embodiment of the invention has been herein illustrated and described by way of example, it is to be understood that the invention is broadly inclusive of any and all modifications falling within the scope of the appended claims.

I claim:

1. In combination, in a machine of the class described, wherein a row of counter disks is mounted upon a shaft and having means for intermittently turning the disk of lowest order, a ratchet fixed relatively to said disk of lowest order to turn with the latter, the ratchet having teeth, each of which has a substantially radial rear face and an inclined forward face, and a spring-pressed pawl cooperable with the ratchet, said pawl having an abutment face engageable with the forward face of a ratchet tooth thereby positively to prevent reverse rotation of the ratchet, and a cam face engageable with the end of a ratchet tooth, said cam face being so designed as to apply pressure to the tooth in a direction to turn the ratchet reversely, thereby to correct accidental overrun of the latter.

2. In combination in a machine of the class described, a shaft having fixed thereon a counter disk, means for turning the shaft, a toothed ratchet wheel fixed to the shaft, a pawl cooperable with the ratchet, spring means normally urging the pawl into operative engagement with the ratchet, the ratchet teeth and the pawl having complemental faces to cam the wheel rearwardly if it be unduly advanced when the pawl first engages a ratchet tooth, each tooth of the ratchet wheel having a substantially radial face and the pawl having a face at its free end which is substantially parallel with and contacts said radial face of the tooth when the wheel is in normal stationary position.

3. In combination in a machine of the class described, a shaft, means for turning the shaft intermittently, a toothed ratchet wheel fixed to the shaft, a pawl cooperable with the ratchet, spring means normally urging the pawl into operative engagement with the ratchet, a cam operative during a portion of the rotation of said shaft to hold the pawl out of engagement with the ratchet, each tooth of the ratchet having a substantially radial forward face and a sloping rear face which is substantially perpendicular to said forward face, the pawl having a face at its free end which is designed to contact the radial face of a ratchet tooth throughout substantially the entire area of the latter when the parts are stationary and in normal position, the pawl having a cam surface which makes an acute angle with said end face and which is cooperable with the sloping rear face of a ratchet tooth to exert pressure force in a direction such as to turn the ratchet wheel until the end face of the pawl engages a radial face of the next tooth.

4. In combination in a multiple-coin fare collecting machine of the class described wherein a row of counter discs is mounted upon a shaft, and having means for intermittently turning the disc of lowest order, a ratchet fixed relatively to the disc of lowest order to turn with the latter, the ratchet having teeth each provided with a substantially radial forward face, a spring-pressed pawl having a flat end face which is substantially radial with reference to the ratchet when it is in full engagement with the rear face of a tooth of the ratchet, the pawl and ratchet having cooperable parts operative to exert force for turning the ratchet through a fractional turn thereby to insure contact of the flat end face of the pawl with the radial face of a ratchet tooth when the ratchet stops, and a cam operative to disengage the pawl from the ratchet preparatory to the turning of the ratchet in the forward direction.

5. In combination in a multiple fare collecting apparatus according to claim 4, wherein the pawl has a cam surface so shaped that when it engages the end of a tooth of the ratchet it exerts pressure force having a component operative to impart a fractional turn to the ratchet, the pawl having an arm which engages the cam, the latter having a dwell portion of such circumferential extent as to hold the pawl out of engagement with the ratchet during a major portion of the rotation of the shaft, but having a steep drop portion operative to allow the pawl to engage the ratchet suddenly as the shaft completes its rotation.

6. In combination in a multiple-coin fare collecting apparatus, an intermittently turning shaft which makes one complete turn and then stops for each cycle of operation of the machine and in response to the deposit of a single coin or token regardless of the denomination of the coin, a rotary counter which turns through one or more units of rotation during a single cycle of operation of the apparatus according to the denomination of the coin deposited, and means operative to impart fractional rotation to the counter element thereby to insure the stopping of the latter in proper position, said means comprising a ratchet fixed to the counter element, a spring-pressed pawl having a flat end face engageable with the radial face of a ratchet tooth thereby positively to terminate advance of the ratchet, the pawl also having a surface engageable with the end of a ratchet tooth and when so engaged to exert force operative to turn the ratchet until the flat end face of the pawl engages the radial face of a ratchet tooth, the pawl having an arm engageable with the cam, the latter having a dwell portion of such circumferential extent as to hold the pawl out of engagement with the ratchet for a period sufficient to enable the counter element to turn through the maximum possible number of units of rotation during a single cycle, the cam having a single radial drop portion operative to allow the pawl suddenly to engage the ratchet as the shaft completes a single turn.

References Cited in the file of this patent

UNITED STATES PATENTS

| | | |
|---|---|---|
| 362,219 | Koch | May 3, 1887 |
| 767,871 | Corbin | Aug. 16, 1904 |
| 1,348,575 | Odhner | Aug. 3, 1920 |
| 1,917,269 | Montgomery | July 11, 1933 |
| 2,035,715 | Pearson | Mar. 31, 1936 |
| 2,040,031 | Spaunburg | May 5, 1936 |
| 2,103,650 | Spaunburg | Dec. 28, 1937 |
| 2,224,770 | Mills | Dec. 10, 1940 |
| 2,244,825 | Carlstrom | June 10, 1941 |
| 2,332,199 | Bliss | Oct. 19, 1943 |
| 2,494,955 | Meyer | Jan. 17, 1950 |

FOREIGN PATENTS

| | | |
|---|---|---|
| 591,217 | France | June 30, 1925 |
| 255,638 | Italy | June 7, 1927 |
| 23,501 | Great Britain | 1912 |
| 370,657 | Germany | Mar. 5, 1923 |